United States Patent [19]

Flaherty

[11] 4,445,694
[45] May 1, 1984

[54] ALL-METAL EXPANDABLE ULTRA HIGH VACUUM SEAL

[75] Inventor: Robert Flaherty, Mt. Lebanon, Pa.

[73] Assignee: Westinghouse Electric Corp., Pittsburgh, Pa.

[21] Appl. No.: 450,583

[22] Filed: Dec. 17, 1982

[51] Int. Cl.³ .............................................. F16J 15/02
[52] U.S. Cl. .......................................... 277/1; 277/26; 277/163; 277/164; 277/205; 277/236; 277/DIG. 6
[58] Field of Search ..................... 277/1, 26, 163, 164, 277/205, 206 R, 235 R, 236, DIG. 6

[56] References Cited

U.S. PATENT DOCUMENTS

| | | | |
|---|---|---|---|
| 3,007,721 | 11/1961 | Schmohl et al. | 277/236 X |
| 3,433,490 | 3/1969 | Teucher et al. | 277/164 |
| 3,604,716 | 9/1971 | Webert | 277/26 |
| 3,820,799 | 6/1974 | Abbes et al. | 277/164 |
| 3,917,294 | 11/1975 | Abbes et al. | 277/236 X |
| 4,114,907 | 9/1978 | Abbes et al. | 277/206 R |
| 4,218,067 | 8/1980 | Halling | 277/236 X |

Primary Examiner—Robert S. Ward, Jr.
Attorney, Agent, or Firm—Z. L. Dermer

[57] ABSTRACT

An all-metal expandable high vacuum seal which expands to a shape suitable for sealing during a material crystallization phase change of one component from martensitic to austenitic.

5 Claims, 5 Drawing Figures

ALL-METAL EXPANDABLE ULTRA HIGH VACUUM SEAL

BACKGROUND OF THE INVENTION

This invention relates to sealing rings for adjacent flange surfaces, especially seal rings utilizing plastic deformation.

Mechanically separable joints in ultra high vacuum systems are most reliably sealed by plastic deformation of metal elements or gaskets. Typical seals are:
(1) Crushed wire rings, of gold, copper, or aluminum
(2) Step seal with flat gasket
(3) Coined gasket seal
(4) Knife edge seal
(5) "Conflat" seal (Varian Associates)
(6) "Cryofit" tube fitting (Raychem Corporation)
(7) "Helicoflex" seal (Carbone-Lorraine Industries Corporation)

In all these seals the sealing force is applied normal to the seal line, because no relative motion of the seal elements can be tolerated other than plastic deformation.

Some very large vacuum systems potentially of great importance cannot be sealed with any of these closure systems because the components to be sealed together cannot approach each other along paths perpendicular to the mating surfaces. An example of such seals are those between torus sections of a 16-segment vacuum vessel of a segmented Tokamak Fusion reactor. Each wedge-shaped segment spans $22\frac{1}{2}°$ and the closure surfaces approach each other along a sloping path of $11\frac{1}{4}°$, i.e., $78\frac{3}{4}°$ away from the normal. During gasket compression therefore the sliding between seal surfaces would be roughly five times as great as the gasket compression. What is needed is a gasket which can be installed without being loaded, then expanded and plastically deformed after the sealing surfaces are positioned and clamped together. An inflatable O-ring seal would have the necessary installation characteristics, but the service conditions sometimes (as in the Tokamak) preclude the use of elastomers.

SUMMARY OF THE INVENTION

An all-metal bakeable ultra high vacuum seal with plastic deformation of the seal which during installation has the contour of a deflated inflatable O-ring seal, but after installation assumes the sealing characteristics of a "helicoflex" seal.

The seal assembly is installed between flange surfaces in contact with only one of the surfaces until the entire closure is assembled and restrained. Sealing is then accomplished by plastic deformation of a seal assembly wrapper against the flanges. The energy to expand and deform the wrapper is provided by restoration of the shape of a shape-memory alloy component inside the wrapper as it undergoes a martensite-austenite transformation with rising temperature.

DETAILED DESCRIPTION OF THE PREFERRED EMBODIMENT

In the following, the details of the invention are described via the steps for manufacture.

Figure 1:
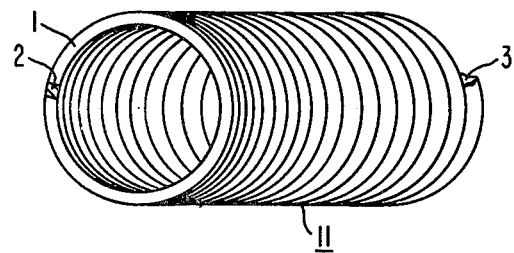
FIG. 1 is an isometric schematic of wire shaped into a helical coil.

Refer to FIG. 1, in which a wire 1 of a shape-memory alloy in its austenitic phase is wound into a closed helical coil 11. Coil 11 is then formed into the shape of the gasket and the ends 2, 3 are joined together. In this condition it is annealed to stabilize its shape.

Figure 2:
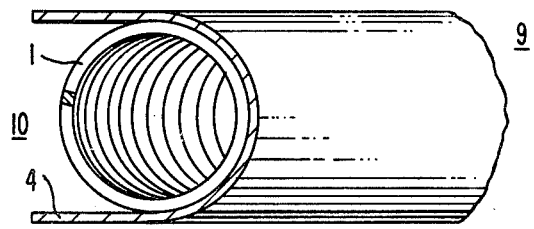
FIG. 2 is an isometric schematic showing the installation of the wire within a wrapper.

As shown by FIG. 2, a wrapper 4 is then put over coil 11 with its open side 10 away from the vacuum space, and its ends are joined by welding to make a continuous ring. Wrapper 4 is the material which will be elastically deformed to close the seal, and is chosen to be a substance capable of little or no additional workhardening, so that elastic deformation will proceed uniformly.

Figure 3:
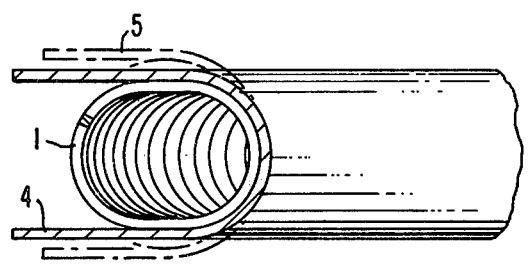
FIG. 3 is an isometric schematic illustrating the mechanical deformation of the seal after chilling.

The assembly is chilled to transform the shape-memory alloy to martensite. It is then reduced in thickness in a press with chilled die-plates, and is maintained in the chilled condition. The dotted lines 5 in FIG. 3 illustrate the unchilled configuration while the solid lines shown the chilled and deformed assembly.

Figure 4:
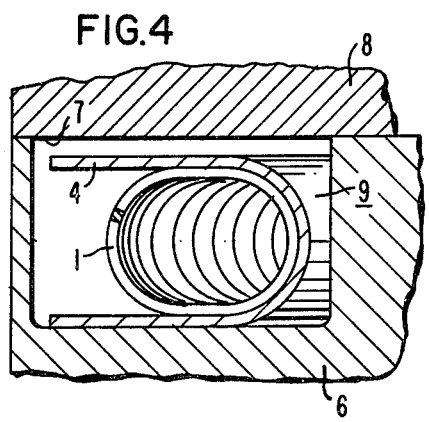
FIG. 4 is an isometric schematic of an installed, chilled seal.

The chilled seal, as in FIG. 4, is placed in a groove 7 in one chilled flange 6, the mating flange 8 is slid into place along its slightly inclined approach path, and flanges 6, 8 are clamped or bolted together to resist the anticipated sealing force. The seal assembly still is in contact with only one flange 6.

Figure 5:
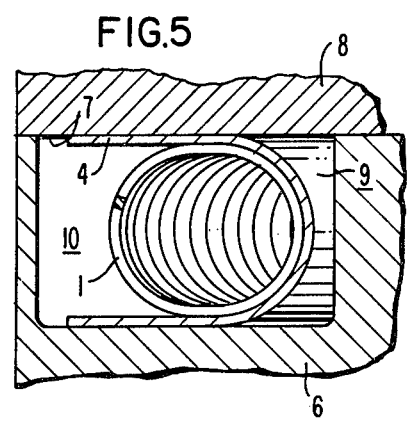
FIG. 5 is an isometric schematic of an installed seal after thermal deformation (warming).

The flanges 6, 8 and seal assembly are allowed to warm up through the transition temperature range of the shape-memory alloy. Coil 11 becomes again austenitic, but is prevented from again assuming its "remembered" circular cross-section, being restrained by flanges 6, 8. The restraining force acts through wrapper 4 and plastically deforms it to seal it against flanges 6, 8. This is shown in FIG. 5. Because of similarity in construction to the "Helicoflex" seal, it is anticipated that this seal can be made to cover the same size range, i.e.:
External Diameter—4 mm to 8000 mm
Section Diameter—1.6 mm to 25 mm
Min. Radius of Curvature—Three times the Section Diameter
Max. Seal Line Length—25.13 meters (82.5 feet)

There are real lower and upper limits to the operating temperature of this seal. The service temperature should preferably be above the transition temperature of the shape-memory alloy, so that the seal can be deformed, stored, and installed with the shape-memory alloy in the martensitic phase; according to the manufacturer of the Ni-Ti alloy "Nitinol", this temperature can be predetermined by minor (proprietary) alloying additions to be wherever desired between a low cryogenic temperature to well above the boiling temperature of water. If the service temperature is below the transition temperature, the seal can be installed and deformed by heating; upon cooling to the service temperature, the shape-memory component will transform without deformation to the lower strength martensitic phase, i.e., the gasket pressure will be reduced. The upper service temperature limit for very long exposure times is about 650° F., above which creep begins to cause relaxation of the force resulting from the "unresolved" strain; this temperature is consistent with Nitinol being basically a titanium alloy.

The shape-memory alloy may be "Nitinol", a reasonably well characterized Ni-Ti alloy produced commercially by Raychem Corportion and Allegheny International Corporation. Equivalent results could probably be obtained using the "Proteus" copper-base shape-memory alloys available from N. V. Baekert S. A. and Metallurgie Hoboken-Overpelt in Belgium.

This seal can be used between two coaxial surfaces, not necessarily round, by radial expansion similar to that of a static O-ring. This type of seal requires that the wrapper be in the radial gap between the annular surfaces.

I claim:

1. An all metal expandable seal for sealing against passage of fluid to a high vacuum environment from a relatively pressurized environment which comprises:
a first spring member composed of a material which remembers a preformed, expanded shape when at a temperature above a martensite phase to austenite phase transition temperature characteristic of said material, said preformed shape being of expanded size suitable for sealing between a first and a second flange surface and wherein said first spring member is surrounded by a second wrapper member which is adapted to bear against the flange surfaces, said wrapper being expanded by said first spring member during transition of said material of said first spring member from a martensite phase to an austenite phase by a temperature increase which phase change causes said first spring member to remember an expanded shape.

2. The seal of claim 1 wherein said first spring member is a helical coil composed of a nickeltitanium alloy.

3. The seal of claim 1 wherein said first spring member is a helical coil composed of Nitinol.

4. The seal of claim 1 wherein said first spring member is a helical coil composed of Proteus copper alloy.

5. A process for sealing against passage of a fluid between high and low pressure regions which comprises:
(a) forming a spring member composed of a shape-memory alloy into an expanded shape at a temperature at which said alloy is austenitic and therefore remembers said shape;
(b) installing said spring member within an expandable wrapper;
(c) chilling said spring member to a temperature at which said alloy converts to a martensitic phase;
(d) compressing said spring member to a reduced size;
(e) installing said spring member between a first and a second flange surface; and
(f) warming said spring member to a temperature whereat said alloy converts back to the austenitic phase, remembers said expanded shape, and therefore elastically deforms the wrapper against said flange surfaces thereby sealing against fluid passage therebetween.

* * * * *